Figure 1:
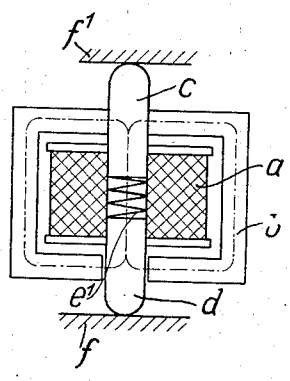

July 23, 1940.  A. PAMPEL ET AL  2,208,910

DEVICE FOR MEASURING LENGTHS

Filed May 27, 1938

Inventors:
Albert Pampel,
Karl Max Harder,
By Potter, Pierce & Scheffler
Attorneys Patented July 23, 1940

2,208,910

UNITED STATES PATENT OFFICE 2,208,910

DEVICE FOR MEASURING LENGTHS

Albert Pampel, Hamburg-Wandsbek, and Karl Max Harder, Hamburg, Germany, assignors to Bauer & Schaurte, Neuss-on-the-Rhine, Germany, a corporation of Germany Application May 27, 1938, Serial No. 210,539 In Germany May 8, 1937

3 Claims. (Cl. 177—351)

The invention relates to a device for length measurement inside pipes and other hollow objects by the electromagnetic principle, in which the change in inductive resistance of an iron-enclosed alternating current choke coil with an air gap located inside the same is employed.

An exceptionally compact construction can be attained in that two pieces of iron separated from each other by an air gap are used as the iron core of the choke coil, the two pieces of iron being constructed so as to be freely displaceable in the coil and to act as feeler pins outside the coil. In this case the result of the measurement is determined solely by the distance between the inner surfaces of the feeler pins defining the air gap, independently of their position in the choke coil otherwise. In consequence, a device of this kind possesses a greatly increased sensitivity and likewise a much greater utilizable measuring field, since the characteristic of the measuring coil in dependence on the size of the air gap varies in a rectilinear manner over a large field.

Figure 2:
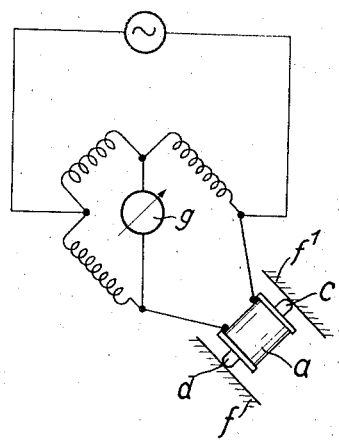

In the drawing, a suitable constructional example of the invention and an arrangement in operation are shown diagrammatically:

Fig. 1 shows a device provided with two movable feeler pins suitable for internal measurements; and Fig. 2 is a circuit diagram for the testing device.

In the device shown in Fig. 1 $a$ denotes an (alternating current) choking coil, in the interior of which two opposed feeler pins $c$ and $d$ are freely shiftable. Between the end faces of said pins, in the air-gap, is a helical compression spring $e^1$ consisting of a paramagnetic material which presses the two pins against walls $f$, $f^1$ of the object to be examined. The coil $a$ is surrounded with an iron yoke $b$ through which the feeler pins $c$ and $d$ extend. The lines of force are indicated by dotted lines. If the yoke has a sufficiently large transverse section, as can practically always be attained, undesired action on the electromagnetic condition of the choking coil may be eliminated. This constructional form is suited especially for internal measurements, and it may be provided for this purpose with suitably arranged grips for facilitating its introduction into the hollow piece or member to be examined. But it is also possible to provide such known supporting members as, for instance, rails or the like. As the two touching pins $c$ and $d$ are freely shiftable towards one another, as well as in the interior of the coil, it can be attained in the case of the measurements of bores with the aid of suitably chosen supporting members that the actual diameter of the bore is always measured.

The measuring instrument is connected up, for example, according to the bridge circuit shown in Fig. 2. In case of a variation in the piece being tested, the size of the air gap enclosed by the inner surfaces of the feeler pins changes so that the deviation of the indicating instrument $g$ of the measuring device is affected in the known way.

What we claim as new and desire to secure by Letters Patent of the United States is:

1. Electric inside measuring gauge comprising an iron-enclosed alternating current coil, two iron cores separated from each other by an air gap located inside said coil and arranged to be movable freely lengthwise of their axis, two feeler pins connected to the same and spring means acting to urge the iron cores apart.

2. Electric inside measuring gauge according to claim 1, having a spring of non-ferrous-magnetic material positioned in the air gap and acting to urge the cores apart.

3. Electric inside measuring gauge comprising an iron-enclosed induction coil, two similar iron cores separated from each other by an air gap located inside said coil and arranged to move freely lengthwise of their axis, with outer ends constructed as feeler pins and spring means acting to urge the iron cores apart.

ALBERT PAMPEL.
KARL MAX HARDER.